Nov. 8, 1955 A. W. GOLASKY 2,722,812
RESILIENT MOUNTING FOR OPERATING DRILLS AT
VARIOUS ANGLES TO DRIVE AXIS
Filed Nov. 25, 1952 2 Sheets-Sheet 1
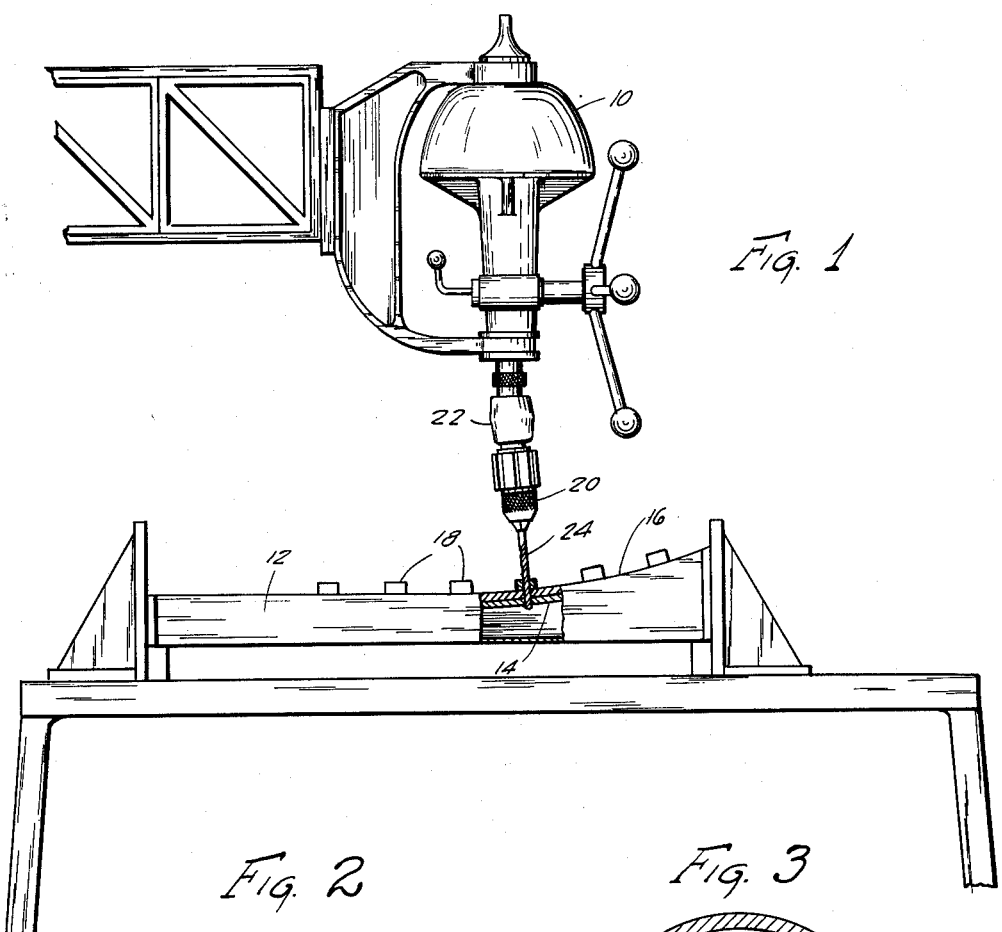
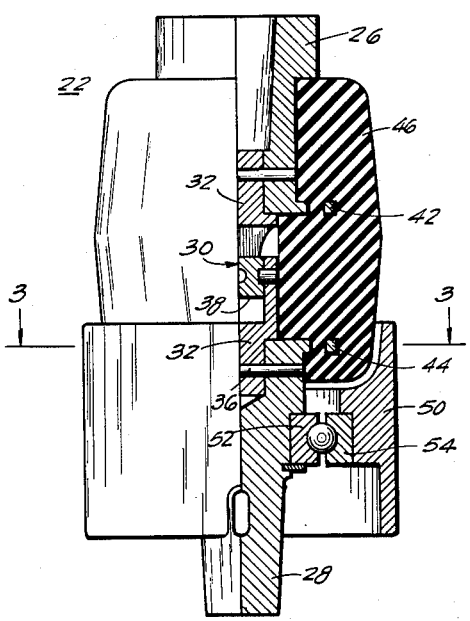
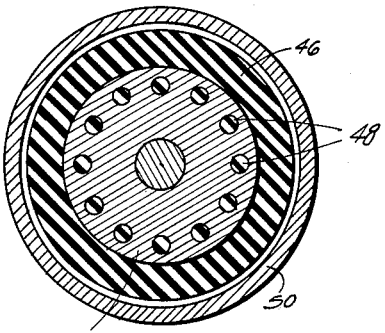
INVENTOR.
ADOLPH W. GOLASKY
ATTORNEYS Nov. 8, 1955    A. W. GOLASKY    2,722,812
RESILIENT MOUNTING FOR OPERATING DRILLS AT
VARIOUS ANGLES TO DRIVE AXIS
Filed Nov. 25, 1952    2 Sheets-Sheet 2
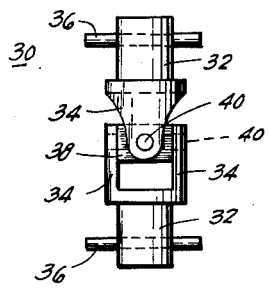
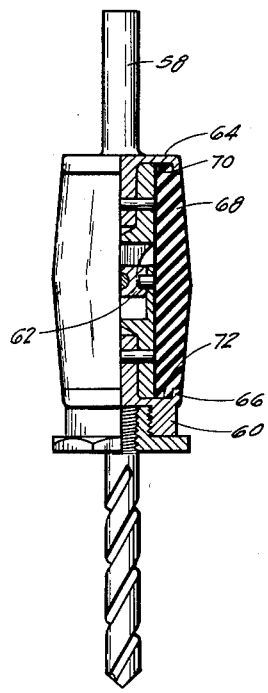
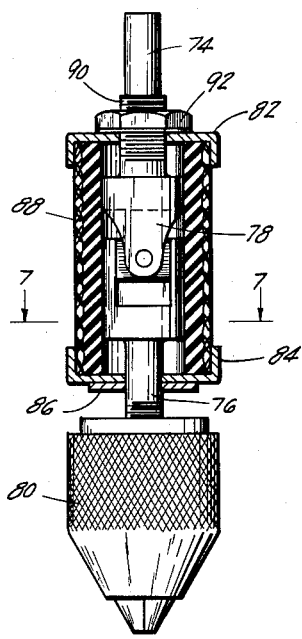
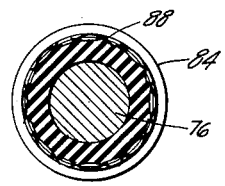
INVENTOR.
ADOLPH W. GOLASKY
BY
ATTORNEYS United States Patent Office 2,722,812
Patented Nov. 8, 1955

2,722,812

RESILIENT MOUNTING FOR OPERATING DRILLS AT VARIOUS ANGLES TO DRIVE AXIS

Adolph W. Golasky, National Park, N. J.

Application November 25, 1952, Serial No. 322,590

1 Claim. (Cl. 64—17)

(Granted under Title 35, U. S. Code (1952), sec. 266)

The invention described herein may be manufactured and used by or for the Government of the United States of America for governmental purposes without the payment of any royalties thereon or therefor.

This invention relates to flexible drive couplings particularly usable in connection with tool holders and chucks for adjustably operating the tool in angular relation to the axis of the drive member.

In the past considerable difficulty has been encountered in cutting and drilling at non-vertical angles, and particularly in drilling a series of holes in aircraft parts in which the holes are inclined to the vertical and to one another. Usually in such circumstances portable or hand electric drills have been employed requiring considerable more time and labor to finish the work than would occur in performing the operation by a standard drill press.

An important object of the invention is to provide an improved flexible drive coupling for use between the drive and driven members of a tool holder or chuck and one which enables the use of standard drill presses for cutting or drilling holes at angles to the vertical.

Another important object of the invention is to provide an improved drive coupling employing resilient means which is designed in an extremely effective manner to permit the driven member or tool to operate at an angle to the axis of a powered shaft or spindle and is sufficiently strong to withstand centrifugal forces developed under high speeds of rotation and to return the parts to normal axial alignment when forces guiding the driven member at an angle are released.

A further important object of the invention is to provide a novel construction and arrangement of parts for a tool holder or chuck which positions a universal drive connection between the drive and driven members and laterally within the outside dimensions thereof and encases the universal joint and the adjacent ends of the drive and driven members within a resilient body such that the elasticity of the body is effectively employed to yieldingly permit operation of the tool at an angle to the drive axis and to return the tool to axial alignment with the drive axis.

Other objects and many of the attendant objects of this invention will be readily appreciated as the same becomes better understood by reference to the following detailed description when considered in connection with the accompanying drawings wherein:

Fig. 1 is a side elevation of a part of a drill press showing the use of the invention thereon for drilling holes in a clamped workpiece at angles to the vertical, Fig. 2 is a side elevation of one form of the invention partially broken away to show the interior arrangement of parts, Fig. 3 is a cross sectional view taken along line 3—3 of Fig. 2, Fig. 4 is a side elevation of a preferred universal joint assembly, Fig. 5 is a side elevation of another form of the invention partially broken away to show the interior arrangement of parts, and Fig. 6 is a view, partly in elevation and partly in section, of a third form of the invention showing an adjustable provision for varying the compression of the resilient body.

Fig. 7 is a section along reference line 7—7 in Figure 6.

Referring to the drawings, Fig. 1 illustrates the head 10 of a standard drill press positioned over a jig fixture 12 to which is clamped a workpiece 14 to be drilled. It is noted in Fig. 1 that the workpiece is convexly curved throughout its length. The openings to be drilled in such workpiece are perpendicularly related to its upper surface 16 and therefore extend at progressively different angles to the vertical and to one another. Carried by the jig fixture is a plurality of guides 18 overlying the surface 16 of the workpiece and inclined at the desired angle for guiding the tool thereinto.

Heretofore, the practice has been to drill a series of holes in such workpiece 14 by using a portable or hand-operated drill. The present invention provides improved means for utilizing the head of a drill press such as illustrated in Fig. 1 for operating the tool at angles to its vertical drive axis. Figs. 2, 3, and 4 illustrate one embodiment of the invention for accomplishing this purpose. In this embodiment the invention takes the form of an adapter positioned between the vertical drive spindle of the drill press head 10 and the tool receiving chuck 20. The adapter is generally indicated at 22 in Fig. 1, and the tool which is permitted to be inclined to the vertical is indicated at 24. The latter is conducted at the desired inclination to the drive axis by the guides 18.

The adapter 22 comprises a drive member 26 adapted to be connected to the lower end of the drill press spindle and a driven member 28 disposed in an end-to-end relation to the drive member. The two members are drivingly coupled together by means of a universal joint indicated generally at 30 and interposed between the adjacent ends of the drive and driven members. Preferably, as indicated in this and the succeeding embodiments of the invention, the universal joint occupies a cross-sectional area no greater than the lateral dimensions of the adjacent ends of the drive and driven members.

Although the universal joint 30 may assume different forms, it is preferably of the type shown in Fig. 4 comprising two similarly formed elements each having a shank portion 32 entering the member with which it is associated and a head portion including two oppositely disposed ears 34—34. The shank portion of each element is pinned as at 36 to its respective member for joint rotation. The heads of the two elements are arranged so that their ears 34 are circularly spaced apart from one another around a common center and overlap axially upon one another. Received in the space between the ears is a square shaped block 38 carrying four laterally projecting pins 40. The pins enter the ears 34 and serve as a driving connection between the joint elements as well as to permit universal movement of each element relative to the other. This is a standard form of universal driving joint and is especially suitable for the invention in that it occupies a small space.

The adjacent ends of the drive and driven members 26 and 28 are preferably correspondingly shaped to provide a radial flange extending substantially completely therearound. These flanges may be circular as shown in Fig. 3. The flange for the drive member 26 is indicated at 42; the flange for the driven member 28 is indicated at 44. The flanges are located in proximity to the universal joint 30 and they project laterally beyond the dimensions of the adjacent ends of the drive and driven members.

The universal joint 30 as well as the adjacent ends of the drive and driven members are enclosed by a body of resilient material indicated at 46. The body in this embodiment of the invention is preferably live rubber. It is formed to closely hug the universal joint and the adjacent portions of the drive and driven members. In addition, the body of live rubber has a substantial lateral extent projecting radially beyond the peripheries of the flanges 42 and 44 as is evident in Fig. 2.

It is preferred to mold the live rubber body 46 onto the tool assembly to thereby cause the rubber to snugly engage the universal joint and the adjacent ends of the drive and driven members and to interengage with the flanges 42 and 44. Each flange 42 and 44 is provided with one or more recesses opening in the direction of the universal joint. Such recessed area may be in the form of a circular series of holes 48 passing completely through the flange from one side to the other side thereof. In the molding operation, the rubber material of the body enters the holes 48 and interlocks therewith. The body of live rubber yieldingly permits the driven member 28 to be inclined to the axis of the drive 26 while the two are jointly rotating. This enables the tool to be guided at different angles to the vertical into the workpiece 14 illustrated in Fig. 1. When the tool is removed from the workpiece while it is still rotating, the centrifugal forces created by any misalignment may tend to throw the driven member and the tool outwardly laterally of the driving axis. The large mass of rubber constituting the body 46 not only resists such centrifugal reaction but returns the driven member and its tool to axial alignment.

Furthermore, in the operation of the device, the two flanges 42 and 44 constitute fixed projecting parts of their respective members against which the resilient body 46 reacts to exert forces tending to return the members to axial alignment. It is evident when the driven member is inclined to the axis of the drive member that the portion of the resilient body on the inside of the angle, and especially between the flanges, will be placed under compression while the portion of the body on the outside of the angle, and also especially between the flanges, will be placed under tension. The advantage of a small size universal joint between the drive and driven members becomes more fully apparent. Being comparatively reduced in lateral dimension, the universal joint provides an annular clearance between the flanges which is filled with the resilient material of the body 46. The interposition of the resilient body between the flanges in this manner as well as its close relation to the universal joint and the adjacent ends of the members provides the desired forces for governing the action of the device.

In order to manually shift the tool to the desired inclination while rotating at high speeds, there is provided a holder which may be gripped by the hand to direct the tool to the desired inclination to enter the selected guide 18. Referring to Figs. 2 and 3 the holder assumes the formation of a metallic sleeve 50 surrounding the driven member 28 of the adaptor. Mounting the sleeve on the driven member but providing relative rotation of one with respect to the other is a form of bearing which in this instance is a ball-bearing 52. The ball bearing includes an inner race 52 fixed to the driven member, an outer race 54 fixed to the sleeve, and a series of balls 56 rolling in the races. In use, the sleeve is gripped by the hand and held stationary while the rotating adapter and tool are forced against the resistance of the resilient body to the desired inclined angle.

In the form of the invention illustrated in Fig. 5, the adapter is constructed for inter-position between the chuck of the drill press and the tool. The tool may form an integral part of the adapter assembly or be separably connected thereto as shown in Fig. 5. The modification of Fig. 5 is generally like that described but is intended for smaller size drills. It comprises a drive member 58 attachable to the chuck, a driven member 60 to which the tool is attached, and a driving universal joint 62 connecting the adjacent ends of the drive and driven members together. The universal joint is of the type shown in Fig. 3. In this form of the invention the shanks of the joint elements are hollow and receive the ends of the drive and driven members.

The drive and driven members 58 and 60 are each provided with a radially projecting flange 64 and 66 respectively located adjacent to the universal joint. Enclosing the universal joint and extending as far as the flanges is a body 68 of resilient material. The resilient body closely hugs the universal joint and the adjacent ends of the members and interengages with the flanges. Each flange is provided with a recessed area opening toward the universal joint for providing such interengagement. As shown in Fig. 5 each flange exhibits a shallow cup-shaped formation with the recess formed thereby opening toward the other flange, the recess for flange 64 being indicated at 70 and that for flange 66 at 72. The resilient body 68 is preferably molded in place and when so formed it enters the clearance between the flanges and the recesses 70 and 72 thereof for interengagement therewith.

Another modification of the invention is illustrated in Fig. 6. In this form the adapter is connectedly interposed between the drive spindle and the chuck as in the embodiment shown in Fig. 2. However, the flange design is generally like that shown in Fig. 5. The drive member is identified by reference character 74; the driven member by reference character 76; and the universal joint by referenece character 78. The chuck 80 is fixed to the lower end of the driven member.

The drive and driven members 74 and 76 each carry radial flanges 82 and 84 respectively which are preferably of the shallow cup-shaped design shown and are arranged so that they open toward one another. In this embodiment of the invention, the flanges 82 and 84 constitute separate parts of their respective members and are slidably fitted thereon. The flange 84 on the driven member may rest directly on the chuck 80 or on a plain washer 86 interposed therebetween.

Enclosing the universal joint 78 and the adjacent ends of the drive and driven members is a resilient body 88. The resilient body in this instance is a sheath of rubber having woven metallic strands embedded in the outer surface of the rubber core. Such a rubber sheath is frequently used as cable insulation.

The cup-shaped flange 82 slidably fits the drive member 74 and bears on the upper end of the resilient sheath 88. The two flanges 82 and 84 are designed to receive the opposite extremities of the resilient sheath. The flange of the drive member is adjustably movable toward the other flange to vary the compression exerted on the resilient body 88. This may be accomplished as shown by providing a threaded section 90 in the vicinity of the flange 82. A nut 92 threaded to this section bears on the flange 82. It is apparent that threaded advancement of the nut toward the universal joint will bodily move the flange element 82 in the same direction and apply a squeezing pressure on the opposite ends of the resilient body. This will increase the resilient pressure exerted by the body on the parts it encloses.

Obviously many modifications and variations of the present invention are possible in the light of the above teachings. It is therefore to be understood that within the scope of the appended claim the invention may be practiced otherwise than as specifically described.

What is claimed is:

In drill press apparatus a rotary drive member; a driven member; a universal joint connecting the driven member to the drive member and permitting the driven member to assume an inclination to the axis of the drive member, the adjacent opposed extremities of the drive and driven members having integral radially projecting flange portions which extend outwardly beyond the exterior peripheral surfaces of the universal joint and the other portions of the drive and driven members; and a body of rubber-like material closely hugging and surrounding said universal joint and the flange portions of the drive and driven members, the said body of rubber-like material having a substantial cross sectional area which forcefully resists an angular displacement of the driven member relative to the drive member.

References Cited in the file of this patent

UNITED STATES PATENTS

| | | |
|---|---|---|
| 103,576 | Coulter | May 31, 1870 |
| 1,179,511 | Egan | Apr. 18, 1916 |
| 1,189,667 | Costello | July 4, 1916 |
| 1,324,898 | Hopcraft | Dec. 16, 1919 |
| 1,778,849 | De Reign | Oct. 21, 1930 |
| 2,271,568 | Olson | Feb. 3, 1942 |
| 2,360,962 | Megathlin | Oct. 24, 1944 |
| 2,534,635 | Stillwagon | Dec. 19, 1950 |
| 2,648,208 | Stillwagon | Aug. 11, 1953 |
| 2,664,002 | Anderson | Dec. 29, 1953 |

FOREIGN PATENTS

| | | |
|---|---|---|
| 501,072 | Great Britain | Feb. 21, 1939 |